A. F. RANDOLPH.
POULTRY DIPPING APPARATUS.
APPLICATION FILED MAR. 27, 1917.
1,311,772.
Patented July 29, 1919.
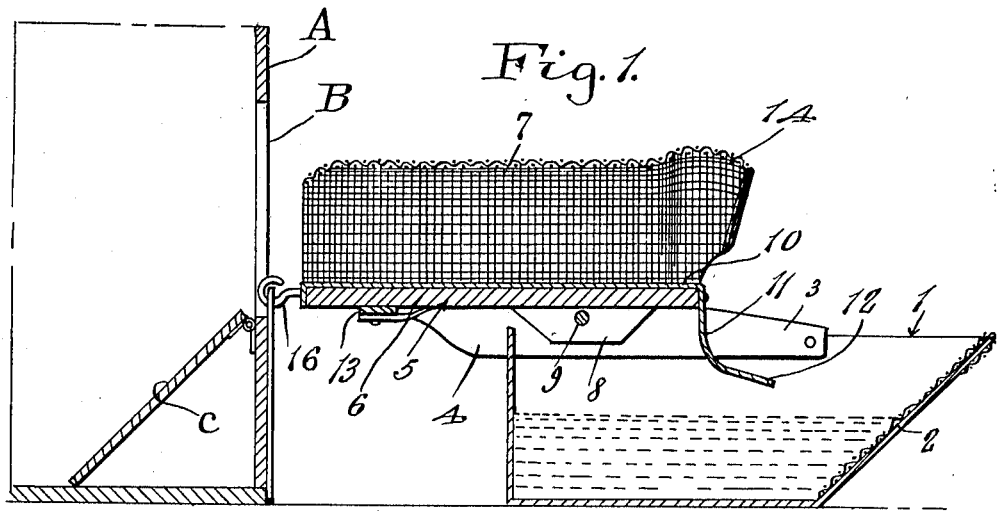
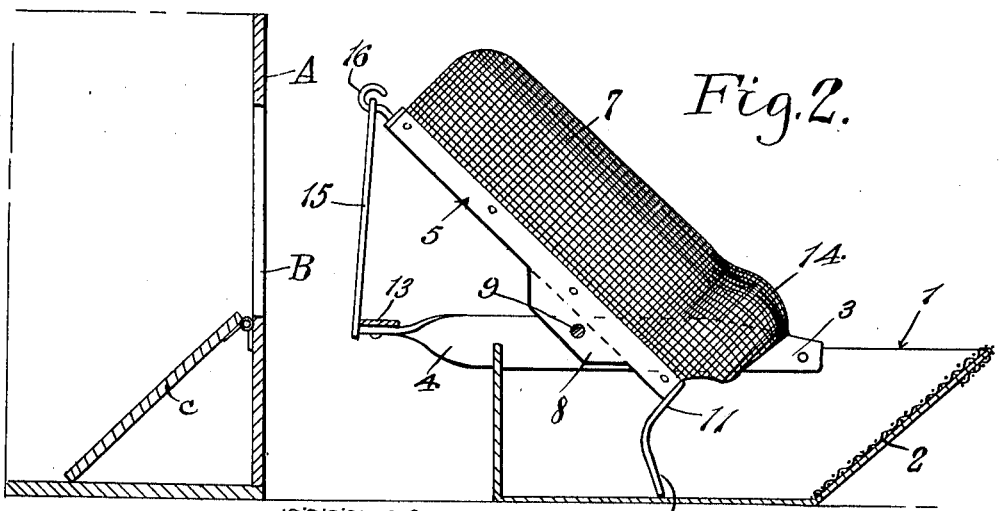
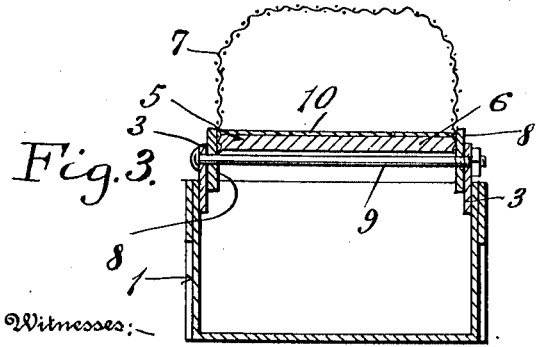
Inventor
A. F. Randolph.

UNITED STATES PATENT OFFICE.

ALVA F. RANDOLPH, OF BLOOMFIELD, IOWA.

POULTRY-DIPPING APPARATUS.

1,311,772.  Specification of Letters Patent.  Patented July 29, 1919.

Application filed March 27, 1917. Serial No. 157,685.

*To all whom it may concern:*

Be it known that I, ALVA F. RANDOLPH, a citizen of the United States, residing at Bloomfield, in the county of Davis and State of Iowa, have invented certain new and useful Improvements in Poultry-Dipping Apparatus; and I do hereby declare the following to be a full, clear, and exact description of the invention, such as will enable others skilled in the art to which it appertains to make and use the same.

This invention relates to poultry dipping apparatus, and the primary object of the invention is the provision of a device of this type adapted to be positioned at the exit of a poultry house and includes a tiltable section to be traversed by the poultry when leaving the house, and a tank forming a support for the tiltable section and adapted to be filled with a suitable liquid, the said tiltable section being adapted to be tilted under the weight of the poultry so as to result in the depositing of the poultry into the tank.

Another object of the invention is the provision of a poultry dipping apparatus of this type including a tank being so constructed that the poultry, after the dipping operation, can conveniently escape from the tank.

A further object of the invention is the provision of a poultry dipping device to be positioned at the exit of a poultry house and including a tiltable section to be traversed by the poultry in leaving the house, and an obstructing element carried by the tiltable section and adapted to close the exit opening in the house upon operation of the tiltable section.

Other objects will appear and be better understood from that embodiment of my invention of which the following is a specification, reference being had to the accompanying drawing forming a part thereof, in which:

Figure 1 is a longitudinal sectional view taken through the dipping apparatus, showing the same positioned adjacent the exit opening of a poultry house, the latter being shown in section, Fig. 2 is a view similar to Fig. 1 with the tiltable section in tilted position, and Fig. 3 is a transverse section taken through Fig. 1.

Referring to the drawing in detail, the letter A designates a portion of a poultry house, B an exit opening in one wall thereof, and C an inclined runway leading to the opening B.

The dipping apparatus is designated, as an entirety, by the numeral 1, and comprises a rectangular shaped tank adapted to be filled with a suitable liquid, the said tank having the forward end wall thereof inclined, as shown at 2. Opposed and parallel extending strips 3 are mounted, respectively, at the upper edges of the side walls of the tank and have their rear ends extending beyond the rear wall of the tank, as shown at 4 in Figs. 1 and 2 of the drawings. Disposed above the tank, and having one end overlying the interior of the tank, is a tiltable section designated, as an entirety, by the numeral 5. The tiltable section consists of a rectangular platform 6, which has its inner or forward end provided with a pair of depending plates 8, the said plates being located, respectively, at the opposite sides of the inner end of the platform 6 and disposed inwardly of the strips 3, and a rod 9 extends through alined openings in the strips 3 and plates 8 and admits of the section 5 having vertical swinging or tilting movement. The platform 6 is provided with a suitable cage 7, which is of a length substantially co-equal with the length of the platform 6 and is formed of meshed wire, and the opposite ends of the cage 7 are open. The sides of the wire cage are fastened to the platform 6 by the depending plate 8. The upper side of the platform 6 is provided with a metallic plate 10, which extends throughout the length of the platform 6 and has its forward end deflected downwardly at an angle, as shown at 11, and thence horizontally, as shown at 12. When the tiltable section 5 is in the position shown in Fig. 1 of the drawing, the rear end of the platform 6 rests upon a transverse strip 13, which has connection with the rear ends of the strips 3, the said strip 13 serving as a stop for limiting the downward movement of the rear end of the tiltable section 5. The inner end of the tiltable section 5 lies in close proximity to the opening B in the wall of the poultry house, so that a fowl in passing through the opening B will step upon the rear end of the platform 6. When the fowl in passing over the platform 6 reaches the forward end of the platform, the said forward end will be tilted downwardly, resulting in the fowl falling from the platform and entering the tank. The horizontal portion 12 at the forward end of the plate 10 will serve as a sub or auxiliary platform upon which the fowl can enter upon before entering the tank, so as to prevent the fowl from falling too rapidly into the liquid in the tank. The extension 12 also limits pivotal movement of the platform. After the fowl has been deposited within the tank, the weight of the rear end of the tiltable section 5 will cause the section 5 to return to normal position, as shown in Fig. 1. The forward end of the cage 7 is bulged outwardly, as shown at 14, so as to provide sufficient room for the projection of the fowl from the tiltable section. After the fowl has been subjected to the bath, the fowl can readily escape from the tank by ascending the inclined end wall 2 of the tank. A plate 15 is located at the rear end of the tiltable section 5 and has the upper edge thereof provided, adjacent the opposite ends of the plate, with openings which receive the bills 16 of a pair of hooks carried by the terminal of the rear end of the platform 6. When the tiltable section 5 is in the position shown in Fig. 2, the plate 15 will be raised and alined with the opening B and obstruct the passage through the opening B. The plate 15 can have vertical swinging movement on the bills of the hooks, and, when desired, the plate 15 can be swung to form a closure for the rear end of the cage 7.

When the tiltable section 5 and the plate 15 are in the position shown in Fig. 2, the lower end of the plate 15 rests against the strip 13 and prevents movement of the plate 15 in the direction of the tank.

It is evident that various changes might be resorted to in the form, construction and arrangement of the several parts without departing from the spirit and scope of the invention as claimed.

Having thus described my invention what I claim as new, is:

1. A dipping apparatus adapted to be arranged at one side of the opening of an inclosure including a tank, a pair of spaced supporting members secured to the tank and extending rearwardly of the same, a platform pivoted to said supporting members, an obstructing plate pivoted to the rear end of said platform, and a transverse strip secured to the rearwardly extending portions of said supporting members and supporting the rear end of said platform when in a horizontal position and engaging said obstructing plate when raised for retaining the same vertical, and over the opening of said inclosure.

2. A dipping apparatus including a tank, a platform pivotally carried thereby, and a metallic plate secured to the upper side of the platform and extending downwardly and forwardly from the forward end of the platform to provide a stepping off platform and to limit the downward pivotal movement of the platform.

In testimony whereof I affix my signature in presence of two witnesses.

ALVA F. RANDOLPH.

Witnesses:
A. M. SWIFT,
G. F. WRIGHT.